(12) United States Patent
Deisinger et al.

(10) Patent No.: US 9,038,136 B2
(45) Date of Patent: May 19, 2015

(54) CONTROL OF SIMPLE NETWORK MANAGEMENT PROTOCOL ACTIVITY

(71) Applicants: Mark V. Deisinger, Roseville, MN (US); Allyn D. Smith, Roseville, MN (US)

(72) Inventors: Mark V. Deisinger, Roseville, MN (US); Allyn D. Smith, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 70 days.

(21) Appl. No.: 13/899,867

(22) Filed: May 22, 2013

(65) Prior Publication Data

US 2014/0351885 A1    Nov. 27, 2014

(51) Int. Cl.
*H04L 29/06* (2006.01)
*H04L 12/24* (2006.01)

(52) U.S. Cl.
CPC ........ *H04L 63/1441* (2013.01); *H04L 41/0213* (2013.01)

(58) Field of Classification Search
CPC .................. H04L 63/1441; H04L 41/0213
USPC ............................................................ 726/3
See application file for complete search history.

(56) References Cited

U.S. PATENT DOCUMENTS

| | | | | |
|---|---|---|---|---|
| 6,515,969 B1 * | 2/2003 | Smith | ............................ | 370/256 |
| 8,699,320 B2 * | 4/2014 | Jain | ................................ | 370/216 |
| 2001/0037395 A1 * | 11/2001 | Sabat et al. | ................... | 709/229 |
| 2001/0043614 A1 * | 11/2001 | Viswanadham et al. | ...... | 370/469 |
| 2003/0120915 A1 * | 6/2003 | Kleinsteiber et al. | ......... | 713/153 |
| 2003/0158971 A1 * | 8/2003 | Renganarayanan et al. | .. | 709/248 |
| 2003/0163727 A1 * | 8/2003 | Hammons et al. | ............. | 713/201 |
| 2003/0172147 A1 * | 9/2003 | Chang et al. | ................... | 709/223 |
| 2004/0049693 A1 * | 3/2004 | Douglas | ......................... | 713/200 |
| 2004/0105435 A1 * | 6/2004 | Morioka | ........................ | 370/359 |
| 2004/0168089 A1 * | 8/2004 | Lee | ................................. | 713/201 |
| 2004/0243835 A1 * | 12/2004 | Terzis et al. | .................... | 713/200 |
| 2005/0283823 A1 * | 12/2005 | Okajo et al. | ....................... | 726/1 |
| 2006/0031454 A1 * | 2/2006 | Ewing et al. | ................... | 709/223 |
| 2006/0133287 A1 * | 6/2006 | Nishi | ............................. | 370/251 |
| 2006/0153167 A1 * | 7/2006 | Schunemann | ................ | 370/352 |
| 2006/0227797 A1 * | 10/2006 | Chandika et al. | ............. | 370/419 |
| 2007/0274234 A1 * | 11/2007 | Kubota | .......................... | 370/254 |
| 2008/0049627 A1 * | 2/2008 | Nordin | ........................... | 370/241 |
| 2008/0072309 A1 * | 3/2008 | Kleinsteiber et al. | ........... | 726/14 |
| 2010/0085971 A1 * | 4/2010 | Schunemann | ................. | 370/392 |

\* cited by examiner

*Primary Examiner* — David García Cervetti

(74) *Attorney, Agent, or Firm* — Richard J. Gregson

(57) ABSTRACT

A server system may be configured to receive configuration information. The server system may also be configured to determine if the configuration information includes SNMP configuration information. The server system may be further configured to disable SNMP activity and close an SNMP port if it determines that the configuration information does not include SNMP configuration information. Therefore, in the absence of any configuration information which specifies that SNMP should be available, SNMP activity is disabled and the SNMP port is closed.

20 Claims, 4 Drawing Sheets

CONTROL OF SIMPLE NETWORK MANAGEMENT PROTOCOL ACTIVITY

FIELD OF THE DISCLOSURE

The instant disclosure relates to computer networks. More specifically, this disclosure relates to port security in computer networks.

BACKGROUND

Data is frequently transferred over networks, in which other users of the network have access to the transferred data. The networks can be public and connected through the Internet, or can be private and completely independent. Public networks have become ubiquitous with the explosion of Internet-enabled devices. However, data transferred over these networks may be sensitive data not intended for viewing by a user other than the recipient. Thus, network security is important. Because data on a network may be accessed through a variety of ports, monitoring and management of the devices and the ports in the network is crucial to network security. To improve network security, the devices of a network may be monitored or managed through the simple network management protocol (SNMP), which is a protocol for transporting management data between networked devices and applications, possibly from a variety of vendors, and systems or applications that monitor or control those devices and applications in a network.

SUMMARY

Network security may be increased by controlling SNMP activity and the status of ports used for SNMP. For example, the default status of an SNMP port may be changed such that the port is only open when specifically instructed to be open. That is, in the absence of any configuration information which specifies that SNMP should be available, SNMP activity is disabled and the SNMP port is closed.

According to one embodiment, a method may include receiving, by a server, configuration information. The method may include determining, by the server, if the configuration information includes SNMP configuration information. The method may also include disabling, by the server, SNMP activity and closing an SNMP port if the server determines that the configuration information does not include SNMP configuration information.

According to another embodiment, a computer program product may include a non-transitory computer readable medium comprising code to perform the steps of receiving configuration information and determining if the configuration information includes SNMP configuration information. The medium may also include code to perform the step of disabling SNMP activity and closing an SNMP port if the configuration information does not include SNMP configuration information.

According to a further embodiment, an apparatus may include a memory, and a processor coupled to the memory. The processor may be configured to execute the steps of receiving configuration information and determining if the configuration information includes SNMP configuration information. The processor may also be configured to execute the step of disabling SNMP activity and closing an SNMP port if the configuration information does not include SNMP configuration information.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
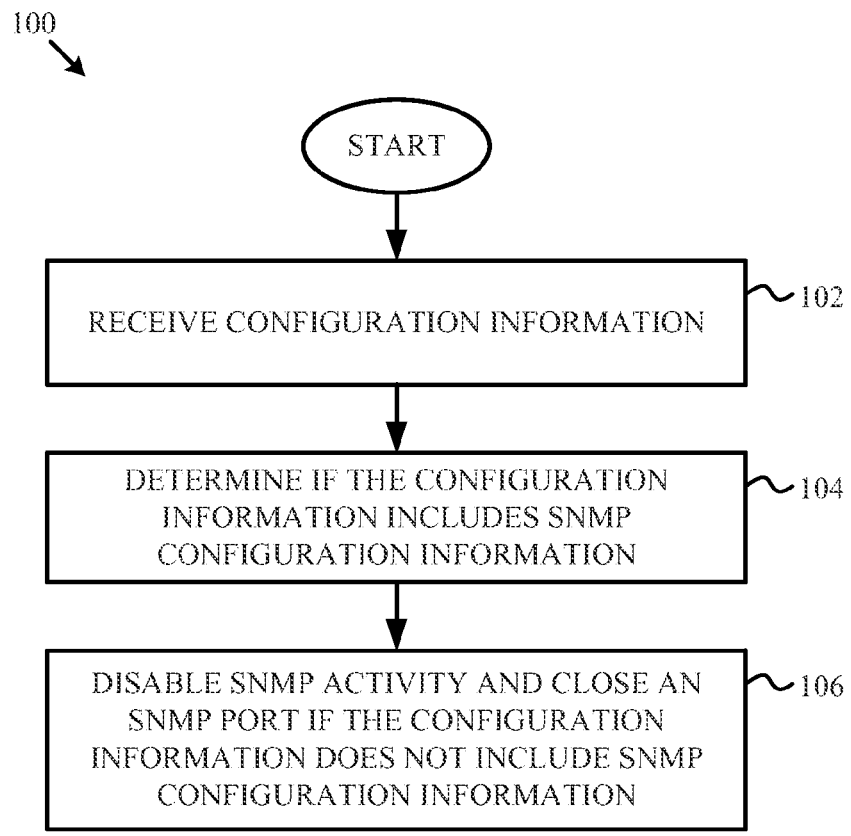
FIG. 1 is a flow chart illustrating a method for controlling SNMP activity according to one embodiment of the disclosure.

FIG. 1 is a flow chart illustrating a method for controlling SNMP activity according to one embodiment of the disclosure. A method 100 begins at block 102 with receiving, by a server, configuration information. In one embodiment, the configuration information may be stored in memory and may be received by the server through access to the memory. In another embodiment, the configuration information may be provided as input to the server by a user. In yet another embodiment, the configuration information may be provided remotely from another computer system. According to some embodiments, the configuration information may be dynamically modified and received.

At block 104, the server determines if the configuration information includes SNMP configuration information. At block 106, if the server determines that the configuration information does not include SNMP configuration information, then the server may disable SNMP activity and close a port for receiving SNMP communications sessions. For example, the server may close SNMP port 161 in the absence of any configuration information which specifies that SNMP is available. By closing the SNMP port, the port may be made unavailable to receive SNMP manager requests from the network. Defaulting to a closed port may improve security of the computer system, because the closed port may prevent malicious attacks on the server system.

According to an embodiment, the server may also disable SNMP activity and close the SNMP port if the server determines that the configuration information includes SNMP configuration information specifying that the SNMP activity is disabled. However, if the server determines that the configuration information includes SNMP configuration information specifying that SNMP activity is enabled, then the server may enable SNMP activity and open the SNMP port.

According to one embodiment, the SNMP configuration information may include a configuration statement specifying whether SNMP activity is enabled or disabled or a configuration statement specifying SNMP settings. As an example of a few of the settings that may be specified, SNMP settings may specify access for a manager, define a specific SNMP community, specify the IP address of a manager, and/or allow an SNMP manager to make changes to some managed objects. If the server determines that the SNMP configuration information includes the configuration statement specifying that SNMP activity is enabled, but does not include a configuration statement specifying SNMP settings, then the server may disable SNMP activity and close the SNMP port.

According to some embodiments, the server may also determine if the SNMP configuration information specifies a protocol, such as a particular protocol version, supported by the server. If the server determines that the protocol specified by the SNMP configuration information is not supported by the server, then the server may discard the SNMP configuration information and/or close the SNMP port.

Figure 2:
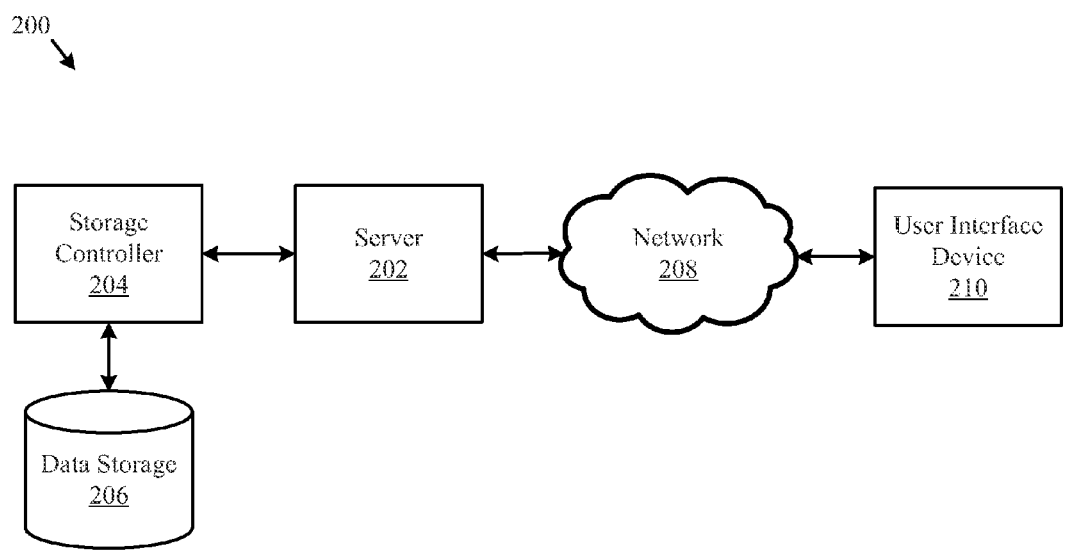
FIG. 2 is a block diagram illustrating a computer network according to one embodiment of the disclosure.

FIG. 2 illustrates one embodiment of a system 200 for an information system, including a system for controlling SNMP activity. The system 200 may include a server 202, a data storage device 206, a network 208, and a user interface device 210. The server 202 may also be a hypervisor-based system executing one or more guest partitions hosting operating systems with modules having server configuration information. In a further embodiment, the system 200 may include a storage controller 204, or a storage server configured to manage data communications between the data storage device 206 and the server 202 or other components in communication with the network 208. In an alternative embodiment, the storage controller 204 may be coupled to the network 208.

In one embodiment, the user interface device 210 is referred to broadly and is intended to encompass a suitable processor-based device such as a desktop computer, a laptop computer, a personal digital assistant (PDA) or tablet computer, a smartphone or other mobile communication device having access to the network 208. In a further embodiment, the user interface device 210 may access the Internet or other wide area or local area network to access a web application or web service hosted by the server 202 and may provide a user interface for enabling a user to enter or receive information.

The network 208 may facilitate communications of data between the server 202 and the user interface device 210. The network 208 may include any type of communications network including, but not limited to, a direct PC-to-PC or PC-to-server connection, a local area network (LAN), a wide area network (WAN), a modem-to-modem connection, the Internet, a combination of the above, or any other communications network now known or later developed within the networking arts which permits two or more computers to communicate.

Figure 3:
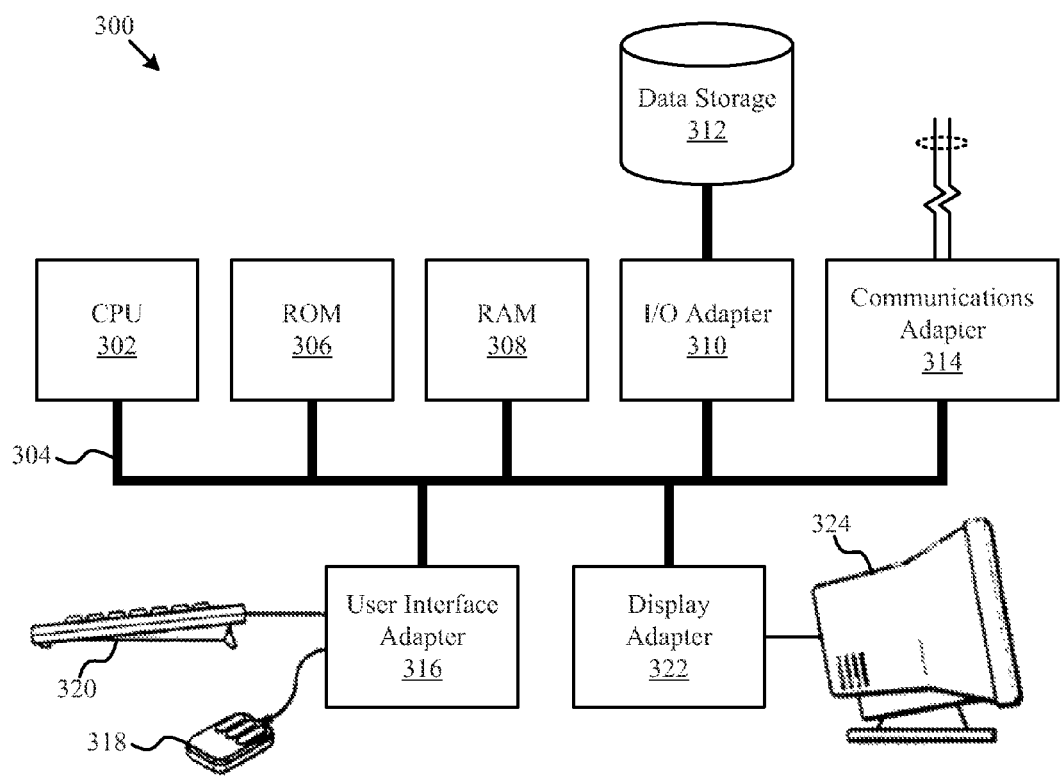
FIG. 3 is a block diagram illustrating a computer system according to one embodiment of the disclosure.

FIG. 3 illustrates a computer system 300 adapted according to certain embodiments of the server 202 and/or the user interface device 210. The central processing unit ("CPU") 302 is coupled to the system bus 304. The CPU 302 may be a general purpose CPU or microprocessor, graphics processing unit ("GPU"), and/or microcontroller. The present embodiments are not restricted by the architecture of the CPU 302 so long as the CPU 302, whether directly or indirectly, supports the operations as described herein. The CPU 302 may execute the various logical instructions according to the present embodiments.

The computer system 300 also may include random access memory (RAM) 308, which may be synchronous RAM (SRAM), dynamic RAM (DRAM), synchronous dynamic RAM (SDRAM), or the like. The computer system 300 may utilize RAM 308 to store the various data structures used by a software application. The computer system 300 may also include read only memory (ROM) 306 which may be PROM, EPROM, EEPROM, optical storage, or the like. The ROM may store configuration information for booting the computer system 300. The RAM 308 and the ROM 306 hold user and system data, and both the RAM 308 and the ROM 306 may be randomly accessed.

The computer system 300 may also include an input/output (I/O) adapter 310, a communications adapter 314, a user interface adapter 316, and a display adapter 322. The I/O adapter 310 and/or the user interface adapter 316 may, in certain embodiments, enable a user to interact with the computer system 300. In a further embodiment, the display adapter 322 may display a graphical user interface (GUI) associated with a software or web-based application on a display device 324, such as a monitor or touch screen.

The I/O adapter 310 may couple one or more storage devices 312, such as one or more of a hard drive, a solid state storage device, a flash drive, a compact disc (CD) drive, a floppy disk drive, and a tape drive, to the computer system 300. According to one embodiment, the data storage 312 may be a separate server coupled to the computer system 300 through a network connection to the I/O adapter 310. The communications adapter 314 may be adapted to couple the computer system 300 to the network 208, which may be one or more of a LAN, WAN, and/or the Internet. The user interface adapter 316 couples user input devices, such as a keyboard 320, a pointing device 318, and/or a touch screen (not shown) to the computer system 300. The display adapter 322 may be driven by the CPU 302 to control the display on the display device 324. Any of the devices 302-322 may be physical and/or logical.

The applications of the present disclosure are not limited to the architecture of computer system 300. Rather the computer system 300 is provided as an example of one type of computing device that may be adapted to perform the functions of the server 202 and/or the user interface device 210. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 300 may be virtualized for access by multiple users and/or applications.

Figure 4A:
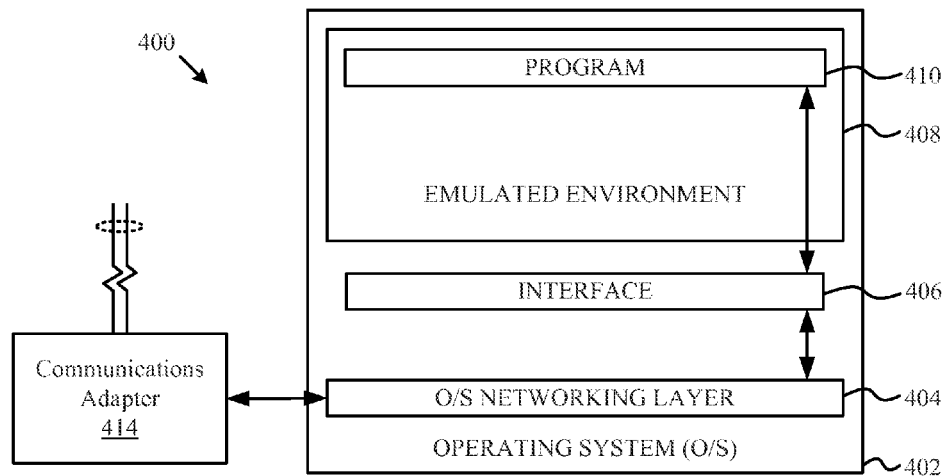
FIG. 4A is a block diagram illustrating a server hosting an emulated software environment for virtualization according to one embodiment of the disclosure.

FIG. 4A is a block diagram illustrating a server hosting an emulated software environment for virtualization according to one embodiment of the disclosure. An operating system 402 executing on a server includes drivers for accessing hardware components, such as a networking layer 404 for accessing the communications adapter 414. The operating system 402 may be, for example, Linux. An emulated environment 408 in the operating system 402 executes a program 410, such as Communications Platform for Open Systems (CPCommOS). The program 410 accesses the networking layer 404 of the operating system 402 through a non-emulated interface 406, such as extended network input output processor (XNIOP). The non-emulated interface 406 translates requests from the program 410 executing in the emulated environment 408 for the networking layer 404 of the operating system 402. In other embodiments, a program 410, such as Communications Platform (CPComm) may communicate directly with the networking layer 404.

Figure 4B:
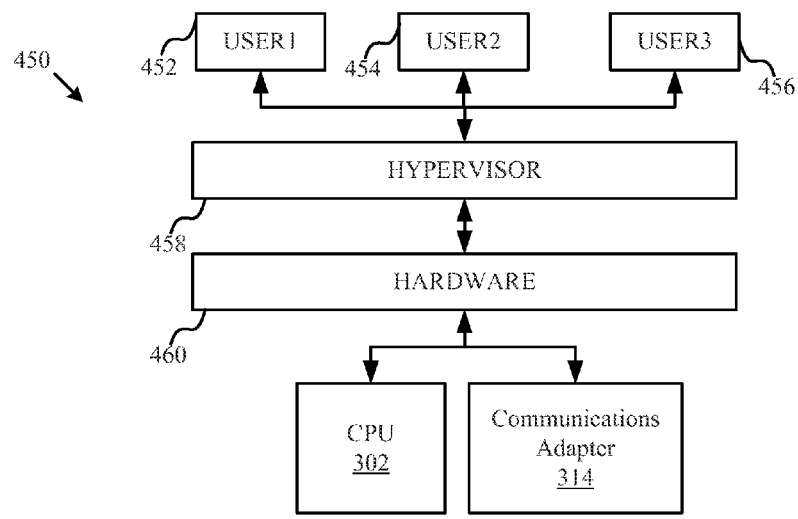
FIG. 4B is a block diagram illustrating a server hosting an emulated hardware environment according to one embodiment of the disclosure.

In another example, hardware in a computer system may be virtualized through a hypervisor. FIG. 4B is a block diagram illustrating a server hosting an emulated hardware environment according to one embodiment of the disclosure. Users 452, 454, 456 may access the hardware 460 through a hypervisor 458. The hypervisor 458 may be integrated with the hardware 460 to provide virtualization of the hardware 460 without an operating system, such as in the configuration illustrated in FIG. 4A. The hypervisor 458 may provide access to the hardware 460, including the CPU 302 and the communications adaptor 314.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
receiving, by a server, configuration information while a simple network management protocol (SNMP) port of the server is closed, wherein the SNMP port was previously closed by default upon starting the server;
determining, by the server, if the configuration information includes SNMP configuration information; and
disabling, by the server, SNMP activity and closing an SNMP port if the server determines that the configuration information does not include SNMP configuration information,
wherein disabling SNMP activity and closing an SNMP port comprises maintaining an SNMP port in a closed state when the SNMP port is already closed.

2. The method of claim 1, further comprising:
disabling, by the server, SNMP activity and closing the SNMP port if the server determines that the configuration information includes SNMP configuration information, in which the SNMP configuration information specifies that SNMP activity is disabled; and
enabling, by the server, SNMP activity and opening the SNMP port if the server determines that the configuration information includes SNMP configuration information, in which the SNMP configuration information specifies that SNMP activity is enabled.

3. The method of claim 2, in which the SNMP configuration information comprises at least one of the following:
a configuration statement specifying whether SNMP activity is enabled or disabled; and
a configuration statement specifying SNMP settings.

4. The method of claim 3, further comprising disabling SNMP activity and closing the SNMP port if the SNMP configuration information includes a configuration statement specifying that SNMP activity is enabled but does not include the configuration statement specifying SNMP settings.

5. The method of claim 1, further comprising:
determining if the SNMP configuration information specifies a protocol supported by the server; and
discarding the SNMP configuration information if the server determines that the protocol specified by the SNMP configuration information is not supported by the server.

6. The method of claim 1, in which the configuration information is dynamically modified.

7. The method of claim 1, in which the configuration information comprises input provided to the server by a user.

8. A computer program product, comprising:
a non-transitory computer readable medium comprising code to perform the steps of:
receiving configuration information while a simple network management protocol (SNMP) port is closed, wherein the SNMP port was previously closed by default;
determining if the configuration information includes SNMP configuration information; and
disabling SNMP activity and closing an SNMP port if the configuration information does not include SNMP configuration information,
wherein disabling SNMP activity and closing an SNMP port comprises maintaining an SNMP port in a closed state when the SNMP port is already closed.

9. The computer program product of claim 8, in which the medium further comprises code to perform the steps of:
disabling SNMP activity and closing the SNMP port if the configuration information includes SNMP configuration information, in which the SNMP configuration information specifies that SNMP activity is disabled; and enabling SNMP activity and opening the SNMP port if the configuration information includes SNMP configuration information, in which the SNMP configuration information specifies that SNMP activity is enabled.

10. The computer program product of claim 9, in which the SNMP configuration information comprises at least one of the following:

a configuration statement specifying whether SNMP activity is enabled or disabled; and a configuration statement specifying SNMP settings.

11. The computer program product of claim 10, in which the medium further comprises code to perform the step of disabling SNMP activity and closing the SNMP port if the SNMP configuration information includes the configuration statement specifying that SNMP activity is enabled but does not include the configuration statement specifying SNMP settings.

12. The computer program product of claim 8, in which the medium further comprises code to perform the steps of:

determining if the SNMP configuration information specifies a supported protocol; and discarding the SNMP configuration information if the protocol specified by the SNMP configuration information is not supported.

13. The computer program product of claim 8, in which the configuration information is dynamically modified.

14. The computer program product of claim 8, in which the configuration information comprises input provided by a user.

15. An apparatus, comprising:

a memory; and a processor coupled to the memory, the processor configured to execute the steps of:

receiving configuration information while a simple network management protocol (SNMP) port of the apparatus is closed, wherein the SNMP port was previously closed by default upon starting the apparatus;

determining if the configuration information includes SNMP configuration information; and disabling SNMP activity and closing an SNMP port if the configuration information does not include SNMP configuration information, wherein disabling SNMP activity and closing an SNMP port comprises maintaining an SNMP port in a closed state when the SNMP port is already closed.

16. The apparatus of claim 15, in which the processor is further configured to perform the steps of:

disabling SNMP activity and closing the SNMP port if the configuration information includes SNMP configuration information, in which the SNMP configuration information specifies that SNMP activity is disabled; and enabling SNMP activity and opening the SNMP port if the configuration information includes SNMP configuration information, in which the SNMP configuration information specifies that SNMP activity is enabled.

17. The apparatus of claim 16, in which the SNMP configuration information comprises at least one of the following:

a configuration statement specifying whether SNMP activity is enabled or disabled; and a configuration statement specifying SNMP settings.

18. The apparatus of claim 17, in which the processor is further configured to perform the step of disabling SNMP activity and closing the SNMP port if the SNMP configuration information includes the configuration statement specifying that SNMP activity is enabled but does not include the configuration statement specifying SNMP settings.

19. The apparatus of claim 15, in which the processor is further configured to perform the steps of:

determining if the SNMP configuration information specifies a supported protocol; and discarding the SNMP configuration information if the protocol specified by the SNMP configuration information is not supported.

20. The apparatus of claim 15, in which the configuration information is dynamically modified.

* * * * *